(12) United States Patent  
Burch et al.

(10) Patent No.: US 8,704,891 B2
(45) Date of Patent: Apr. 22, 2014

(54) EXTERNAL MOUNTED ELECTRO-OPTIC SIGHT FOR A VEHICLE

(75) Inventors: Jason F. Burch, Loogootee, IN (US); Michael E. Zimmer, Springville, IN (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 776 days.

(21) Appl. No.: 12/646,133

(22) Filed: Dec. 23, 2009

(65) Prior Publication Data

US 2011/0149055 A1    Jun. 23, 2011

(51) Int. Cl.
  *H04N 7/18*    (2006.01)
  *H04N 5/64*    (2006.01)
  *G02F 1/03*    (2006.01)
  *G02F 1/29*    (2006.01)

(52) U.S. Cl.
  USPC ........... 348/148; 348/143; 348/149; 348/836; 348/837; 359/245; 359/315

(58) Field of Classification Search
  None
  See application file for complete search history.

(56) References Cited

U.S. PATENT DOCUMENTS

| | | |
|---|---|---|
| 4,393,597 A | 7/1983 | Picard et al. |
| 4,811,061 A | 3/1989 | Sud et al. |
| 4,815,757 A | 3/1989 | Hamilton |
| 5,123,327 A | 6/1992 | Alston et al. |
| 5,170,352 A | 12/1992 | McTamaney et al. |
| 5,204,489 A | 4/1993 | Pellarin et al. |
| 5,729,016 A * | 3/1998 | Klapper et al. ............... 250/334 |
| 5,793,541 A | 8/1998 | Cattan et al. |
| 5,822,713 A | 10/1998 | Profeta |
| 6,347,010 B1 | 2/2002 | Chen et al. |
| 6,359,681 B1 | 3/2002 | Housand et al. |
| 6,484,619 B1 | 11/2002 | Thomas et al. |
| 6,524,020 B2 | 2/2003 | Ellinger et al. |
| 6,540,198 B2 | 4/2003 | Carter et al. |
| 7,053,993 B2 | 5/2006 | de Virel |
| 7,086,318 B1 | 8/2006 | Darnall |
| 7,234,570 B1 | 6/2007 | Exely et al. |
| 7,942,092 B1 * | 5/2011 | Kiel et al. .................... 89/36.13 |
| 2004/0223062 A1 | 11/2004 | Pettegrew et al. |
| 2007/0119296 A1 | 5/2007 | Niv et al. |
| 2009/0025545 A1 | 1/2009 | Persson et al. |
| 2009/0033045 A1 | 2/2009 | Clemens et al. |
| 2009/0138138 A1 | 5/2009 | Ferren et al. |
| 2009/0255763 A1 | 10/2009 | Nieboer et al. |

FOREIGN PATENT DOCUMENTS

| | | |
|---|---|---|
| EP | 0515334 | 11/1992 |
| WO | WO03091069 | 11/2003 |
| WO | WO2004047421 | 6/2004 |

* cited by examiner

*Primary Examiner* — Ranodhi Serrao
*Assistant Examiner* — Farrukh Hussain
(74) *Attorney, Agent, or Firm* — Christopher A. Monsey (57) ABSTRACT

An electro-optic display unit is disclosed. The electro-optic unit may be mountable to an exterior of a vehicle and may be rotatable about a single axis of rotation.

32 Claims, 10 Drawing Sheets

EXTERNAL MOUNTED ELECTRO-OPTIC SIGHT FOR A VEHICLE

STATEMENT REGARDING FEDERALLY SPONSORED RESEARCH OR DEVELOPMENT

The invention described herein was made in the performance of official duties by employees of the Department of the Navy and may be manufactured, used and licensed by or for the United States Government for any governmental purpose without payment of any royalties thereon.

BACKGROUND

The present invention relates generally to devices for holding one or more electro-optical devices, and, more particularly, to devices for holding one or more electro-optic devices and orienting the one or more electro-optic devices.

Vehicles, such as tanks and personnel carriers, have traditionally included a periscope system which is extended from an interior of the vehicle to monitor the environment. The periscope system includes various electro-optic components. The periscope system takes up space in the interior the vehicle.

SUMMARY

In an exemplary embodiment of the present disclosure, an electro-optic unit for mounting to a vehicle is provided. The electro-optic unit comprising a base; a housing including therein at least one of a visible band camera, a thermal imager, a laser pointing device, a laser designator, and a laser rangefinder; a first upstanding guard member supported by the base; a second upstanding guard member supported by the base; at least one motor supported by the base. The housing being positioned between the first upstanding guard member and the second upstanding guard member and being rotatable by the at least one motor relative to the first upstanding guard member and the second upstanding guard member.

In another exemplary embodiment of the present disclosure, a vehicle is provided. The vehicle comprising a plurality of ground engaging members; a frame supported by the plurality of ground engaging members; a prime mover supported by the frame and operatively coupled to at least one of the plurality of ground engaging members to propel the vehicle; a skin covering at least a portion of the frame; the skin defining an exterior of the vehicle; and an electro-optic unit supported by the frame. The electro-optic unit including a housing supporting therein at least one of a visible band camera, a thermal imager, a laser pointing device, a laser designator, and a laser rangefinder and at least one optical window in an exterior of the housing. The housing being moveable in a single degree of freedom relative to the skin between a stored position and a use position. The housing remaining outside of the skin in both the stored position and the use position.

BRIEF DESCRIPTION OF THE DRAWINGS

The foregoing aspects and many of the attendant advantages of this invention will become more readily appreciated as the same become better understood by reference to the following detailed description when taken in conjunction with the accompanying drawings.

Corresponding reference characters indicate corresponding parts throughout the several views. Although the drawings represent embodiments of various features and components according to the present invention, the drawings are not necessarily to scale and certain features may be exaggerated in order to better illustrate and explain the present invention. The exemplification set out herein illustrates embodiments of the invention, and such exemplifications are not to be construed as limiting the scope of the invention in any manner.

DETAILED DESCRIPTION OF THE DRAWINGS

For the purposes of promoting an understanding of the principles of the invention, reference will now be made to the embodiments illustrated in the drawings, which are described below. The embodiments disclosed below are not intended to be exhaustive or limit the invention to the precise form disclosed in the following detailed description. Rather, the embodiments are chosen and described so that others skilled in the art may utilize their teachings. It will be understood that no limitation of the scope of the invention is thereby intended. The invention includes any alterations and further modifications in the illustrated devices and described methods and further applications of the principles of the invention which would normally occur to one skilled in the art to which the invention relates.

Figure 1:
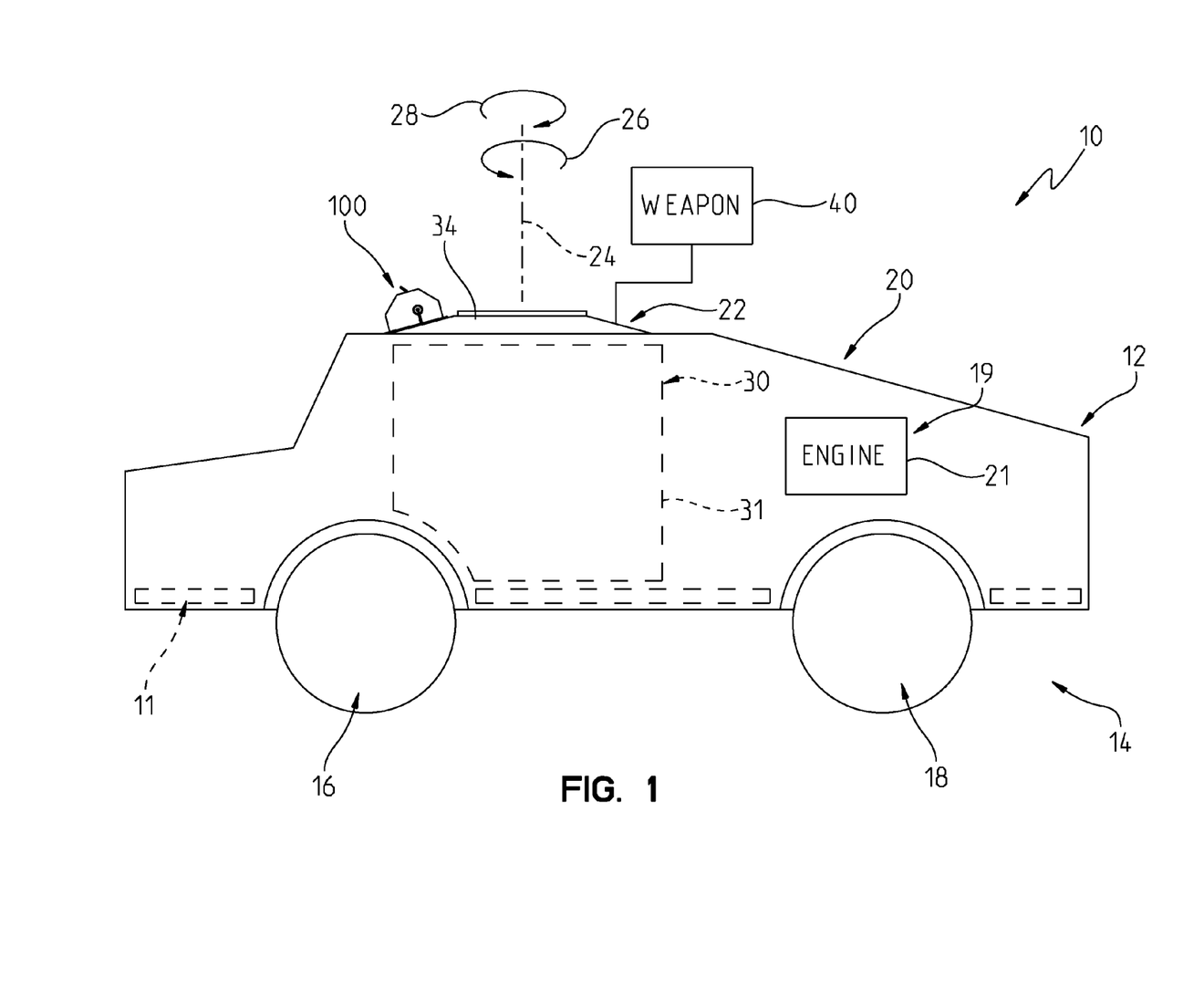
FIG. 1 illustrates a side view of an exemplary vehicle having an exemplary eletro-optic unit coupled to a skin of the vehicle.
Figure 2:
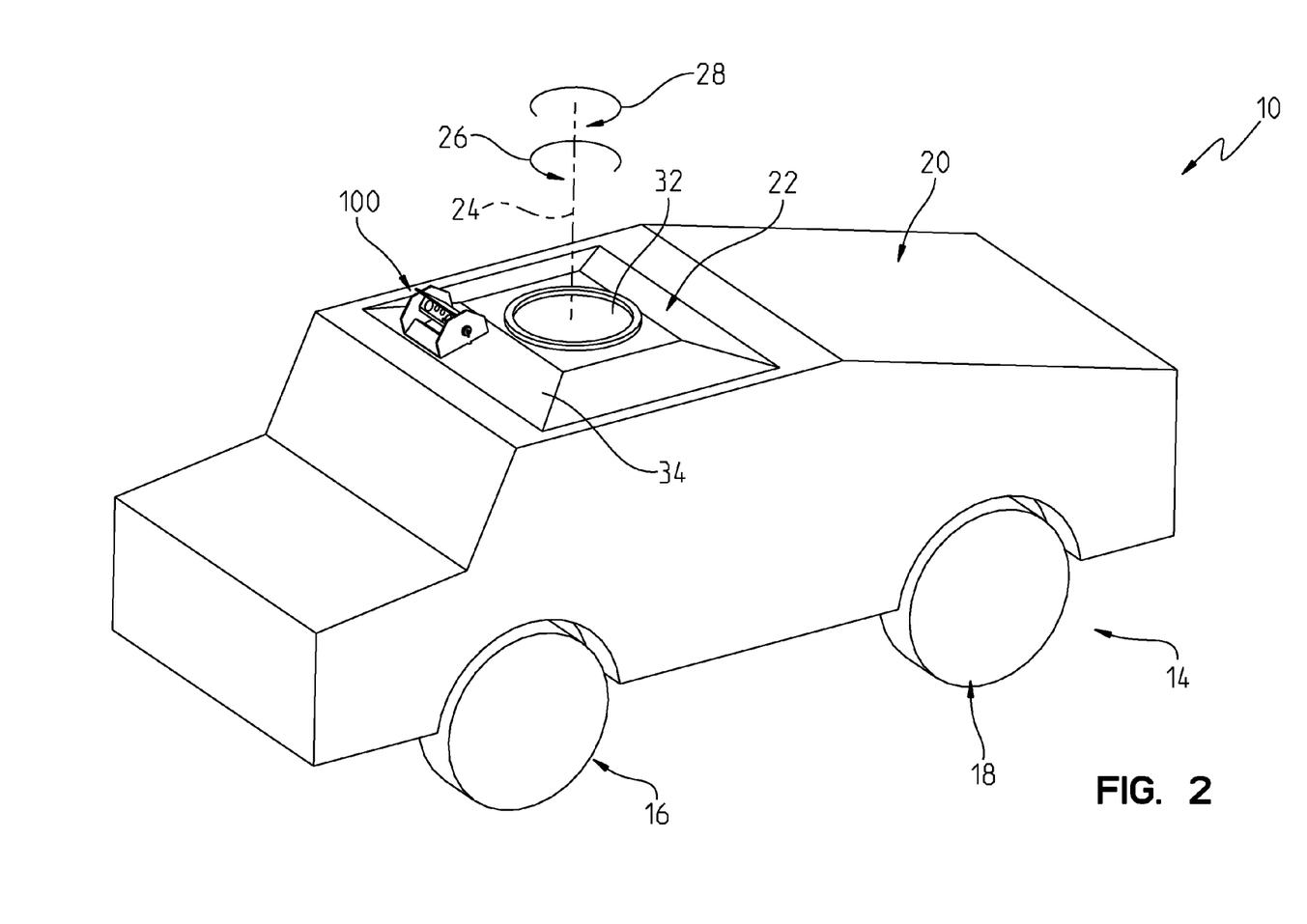
FIG. 2 illustrates a perspective view of the exemplary vehicle of FIG. 1.

Referring to FIG. 1, a vehicle 10 is shown. Vehicle 10 includes a body 12 supported by a frame 11 which is in turn supported by a plurality of ground engaging members 14. In the illustrated embodiment, the ground engaging members 14 include a first set of wheels 16 and a second set of wheels 18. Other exemplary ground engaging members 14 include tracks and other suitable ground engaging members. At least a portion of wheels 16 and wheels 18 are powered by a prime mover, illustratively an engine 21, to propel vehicle 10. Other exemplary prime movers include electric motors and other suitable devices for powering vehicle 10.

Vehicle 10 includes a first portion 20 and a second portion 22. Second portion 22 is rotatable relative to first portion 20 about an axis 24 in direction 26 and direction 28. In one embodiment, second portion 22 is rotatable relative to first portion 20 only about axis 24. In this embodiment, second portion 22 has a single degree of freedom relative to first portion 20.

Vehicle 10 includes an operator area 30. An entrance to operator area 30 is through door 32. In one embodiment, second portion 22 is a movable platform and operator area 30 rotates with second portion 22. An exemplary moveable platform is a turret. In one embodiment, operator area 30 does not rotate with second portion 22. In operator area 30 one or more persons are positioned who through various controls control the movement of vehicle 10 and the movement of second portion 22 relative to first portion 20.

In one embodiment, vehicle 10 supports a weapon 40. Exemplary weapons include water cannons, projectile launching devices, and other suitable weapon devices. In one embodiment, weapon 40 is supported by and rotates with second portion 22. In one example, weapon 40 is rotatably mounted to second portion 22 and is able to move in one or more directions relative to second portion 22. In one embodiment, weapon 40 is mounted on first portion 20 and does not move with second portion 22. In one example, weapon 40 is rotatably mounted to first portion 20 and is able to move in one or more directions relative to first portion 20.

Second portion 22 also supports an electro-optic unit 100. Electro-optic unit 100 also moves with second portion 22. As explained herein, in one embodiment, electro-optic unit 100 is moveable relative to second portion 22. The exterior of first portion 20 and second portion 22 form a skin 34 of vehicle 10. Electro-optic unit 100 is mounted to skin 34 of second portion 22. In one embodiment, electro-optic unit 100 is secured to skin 34 with an adhesive. In one embodiment, electro-optic unit 100 is secured to skin 34 by bolting the electro-optic unit 100 to skin 34.

Figure 3:
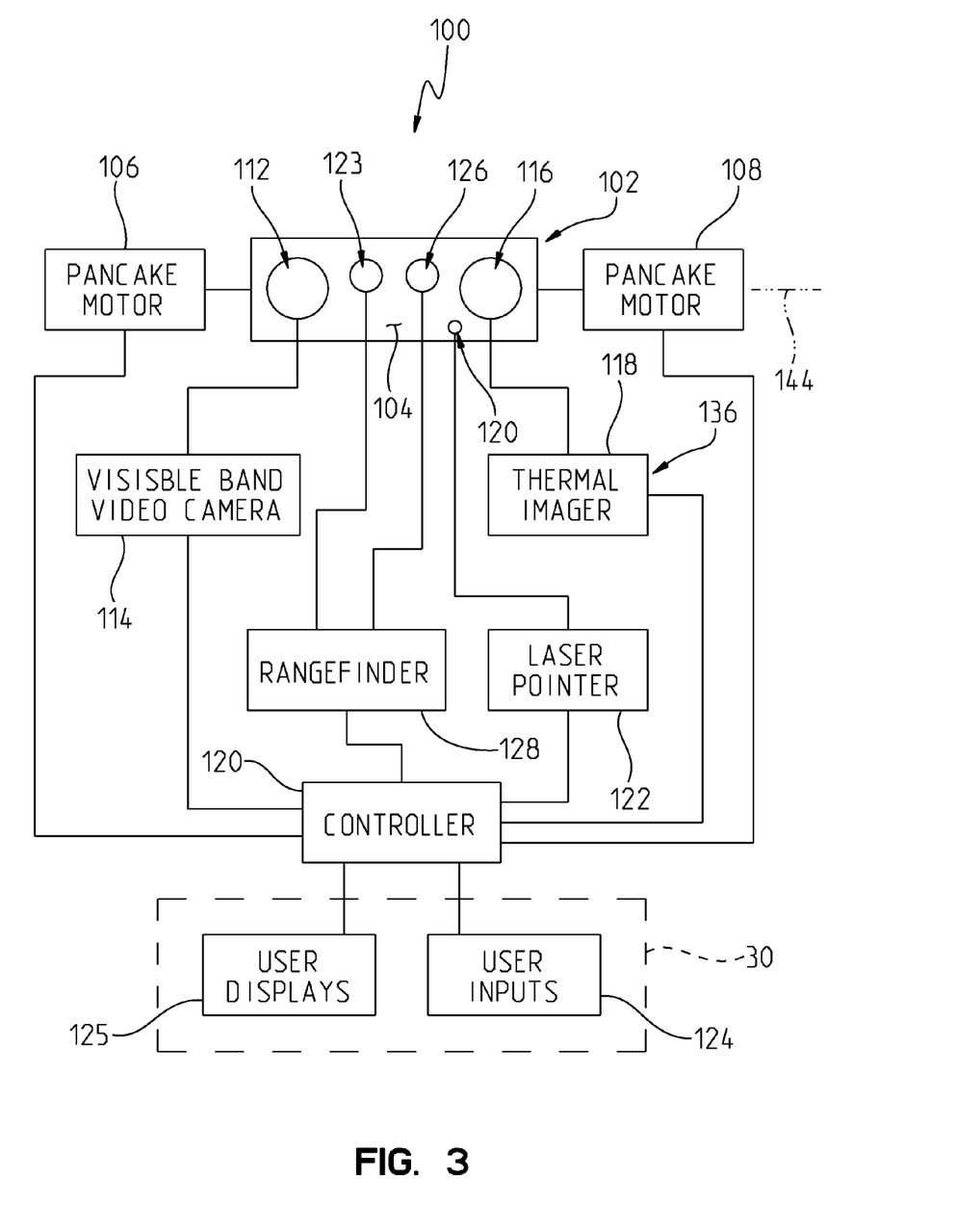
FIG. 3 illustrates a representative view of the electro-optic unit of FIG. 1.

Referring to FIG. 3, an exemplary embodiment of electro-optic unit 100 is shown. The electro-optic unit 100 is coupled to a pair of motors, illustratively pancake motors 106 and 108, which move electro-optic unit 100 in a single degree of rotational movement (up and down) about axis 144. In the illustrated embodiment, axis 144 is a horizontal axis. In one embodiment, only a single pancake motor is used and the other side of electro-optic unit 100 is rotatable about a bearing. A front face 104 of a housing 102 of electro-optic unit 100 includes a plurality of optical windows which correspond to various electro-optic devices housed within electro-optic unit 100. A first optical window 112 corresponds to a visible band camera 114. An exemplary visible band camera is a CCD camera. A second optical window 116 corresponds to a thermal imager 118. A third optical window 120 corresponds to a laser pointing device 122 which can either be a visible laser or an infrared laser. Laser pointing device 122 provides an optical spot on an object which may be used to locate the object. In one embodiment, a laser designator is provided instead of the laser pointing device 122. A laser designator provides an optical spot on an object which may be used to locate the object; the optical spot is typically pulsed to uniquely identify the optical spot to tracking devices. The last two remaining optical windows 123 and 126 correspond to a rangefinder device 128. Rangefinder device 128 determines a range from electro-optic unit 100 to an object. Any combination of visible band camera 114, thermal imager 118, laser pointing device 122, laser designator, and rangefinder device 128 are collectively referred to electro-optic devices 136.

The operation of pancake motors 106 and 108 and the various electro-optical devices 136 are controlled by a controller 120. Controller 120 provides images and other data to one or more user displays 122 provided in operator area 30 inside of vehicle 10 and receives input to control the pancake motors 106 and 108 and the various electro-optical devices from user inputs 124 provided in operator area 30 inside of vehicle 10. Exemplary user input devices 124 include a joystick hand controller and one or more buttons.

Figure 4:
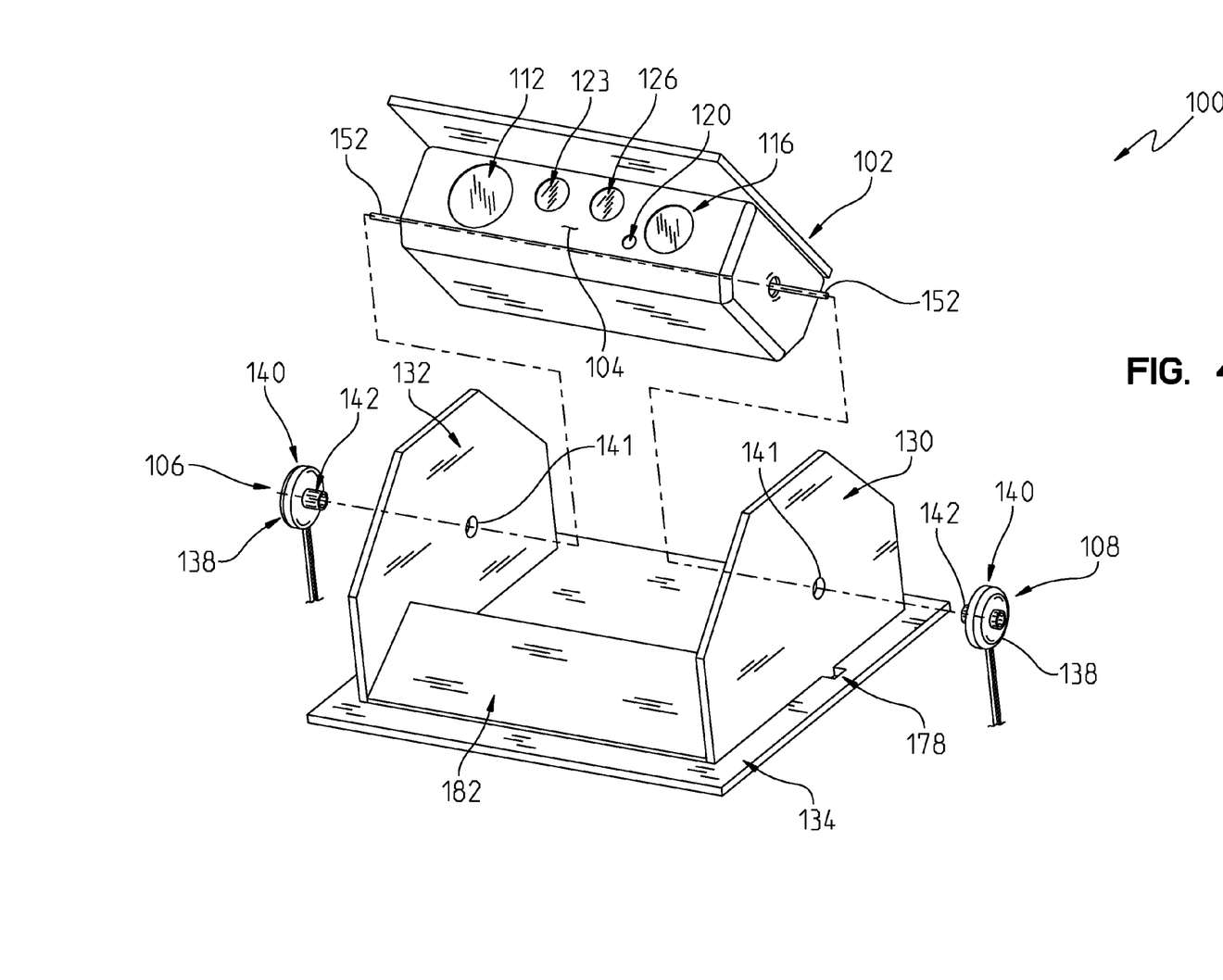
FIG. 4, illustrates an exploded view of portions of the electro-optic unit of FIG. 1.

Referring to FIG. 4, electro-optic unit 100 is placed between two upstanding guards 130 and 132 which protect the electro-optic unit 100 from tree branches and other obstacles that vehicle 10 may encounter as it is maneuvering. In one embodiment, upstanding guards 130 and 132 are made of a ballistic material which protects the electro-optic unit 100 from projectiles fired towards electro-optic unit 100. Exemplary ballistic materials include steel plates, ceramic, KEVLAR brand material, and other suitable materials designed to prevent penetration by projectiles. The two upstanding guards 130 and 132 form a generally box-like structure to protect housing 102. Guards 130 and 132 are secured to a base member 134 which in turn is secured to skin 34 of vehicle 10. Guards 130 and 132 may be secured to base member 134 through mechanical couplers, welding, and other suitable methods of coupling. In the illustrated embodiment, each of guard 130, guard 132, and base member 134 are plates. Electro-optic unit 100 remains on the outside of skin 34 regardless of the position of housing 102 of electro-optic unit 100. In an alternative embodiment, electro-optic unit 100 is positioned on a motorized lift which recedes the electro-optic unit within the skin 34 of vehicle 100 when in a stored position and raises the electro-optic unit 100 when in a use position.

Figure 7:
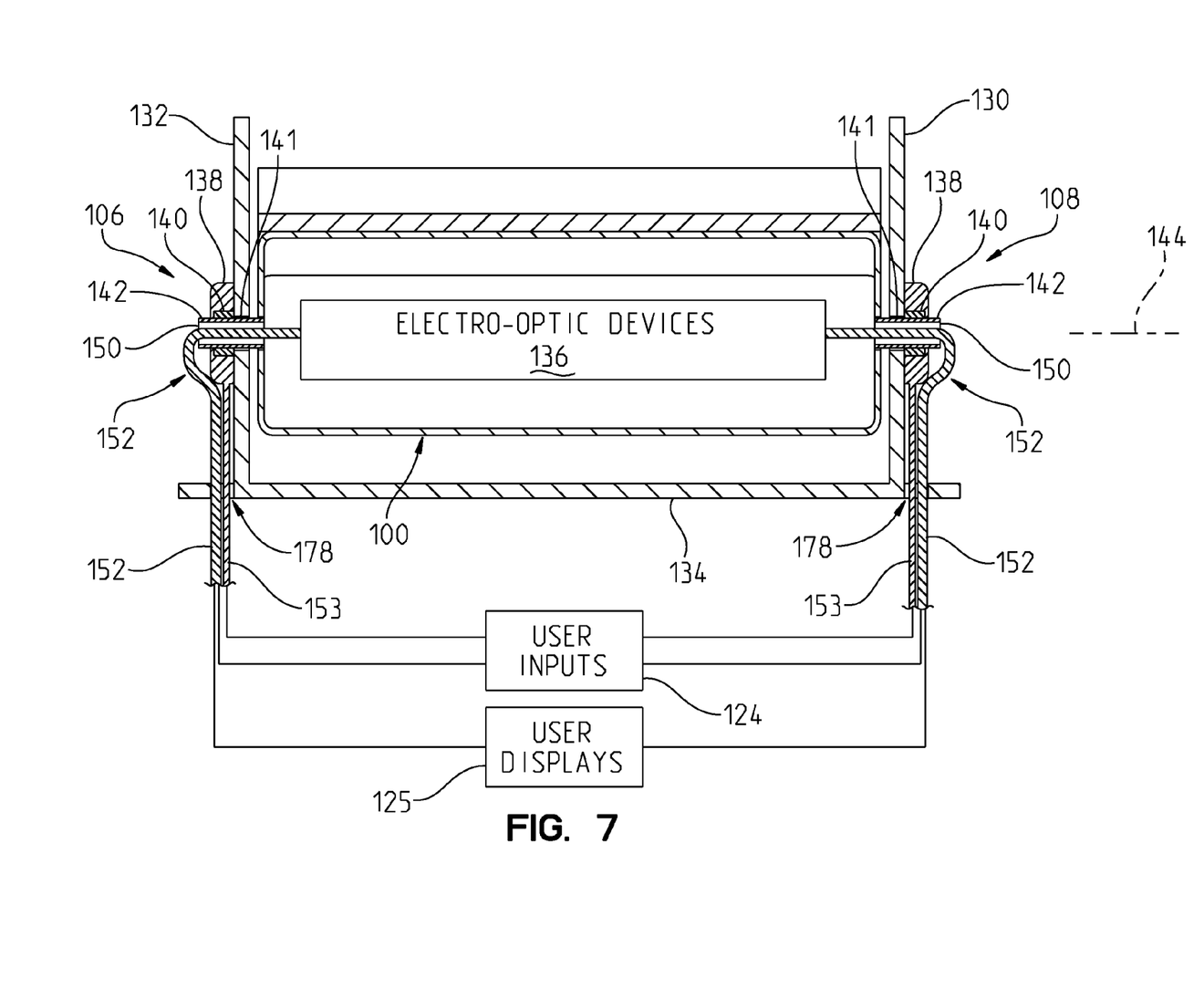
FIG. 7 illustrates a sectional view of the electro-optic unit of FIG. 5 along lines 7-7 in FIG. 5.

Pancake motors 106 and 108 couple the housing 102 of the electro-optic unit 100 to guards 130 and 132 as shown in FIG. 7. In one embodiment, pancake motors 106 and 108 are coupled to both of housing 102 and the respective upstanding guard members 130 and 132. Pancake motors 106 and 108 provide stabilization to electro-optic devices 136 to minimize the effect of vibrations of the vehicle 10 on the electro-optic devices 136. In one embodiment, pancake motors 106 and 108 are electrical motors. Each of pancake motors 106 and 108 include a housing 138, a first portion 140 and a second portion 142. Second portion 142 is rotatable relative to first portion 140 due to the input to the respective pancake motor 106 and pancake motor 108 from laser pointing device 122 in operator area 30. Referring to FIG. 7, second portion 142 passes through an opening 141 in the respective guard member 130 and 132 and is coupled to housing 102 of electro-optic unit 100. Housing 102 rotates with second portion 142 about an axis 144. Second portion 142 may be coupled to housing 102 in any conventional way, such as welding, press fit, interlocking threads, and other suitable methods.

In one embodiment, second portion 142 has a hollow interior 150 through which control lines 152 for electro-optic devices 136 pass. Control lines 152 are coupled to user inputs 124 and user displays 125 which are located in operator area 30. In the embodiment shown in FIG. 7, control lines 152 are contiguous.

Figure 8:
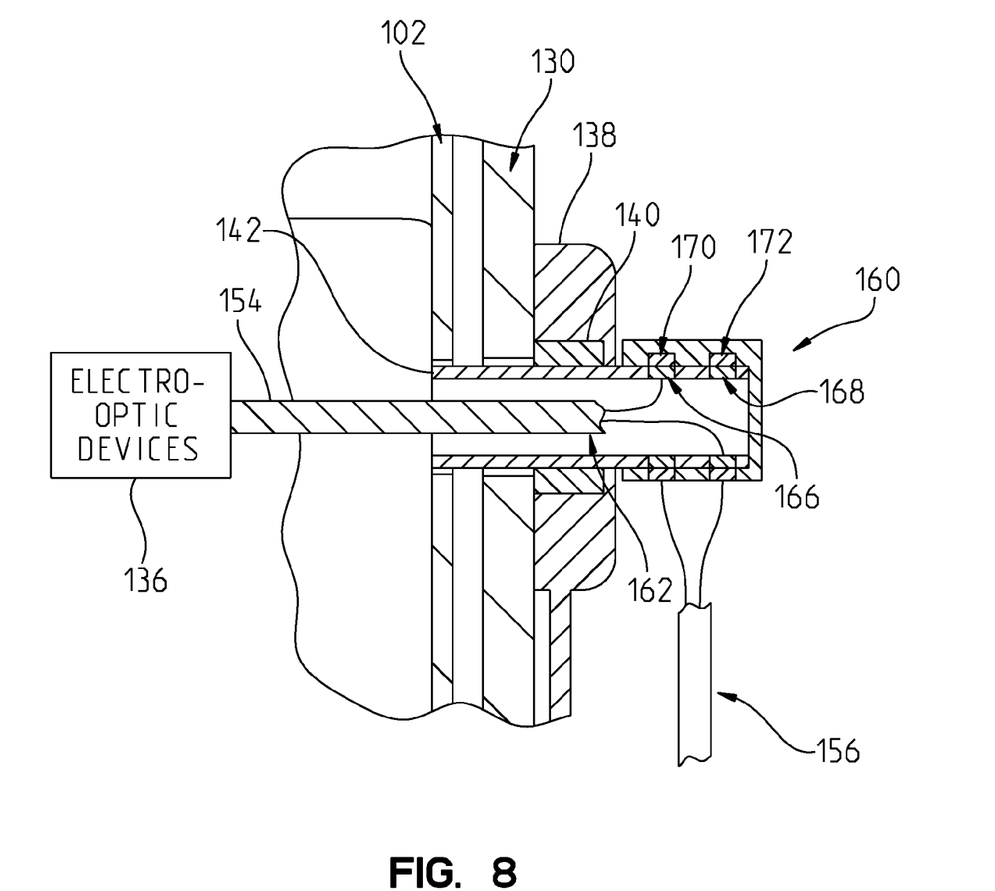
FIG. 8 illustrates a slip ring configuration for providing electrical connection between the electro-optic devices housed within a housing of the electro-optic unit of FIG. 5 and the user inputs and displays within an operator area of the vehicle of FIG. 1.

In another embodiment, shown in FIG. 8, control lines 152 are broken into two sets of control lines 154 and 156. Lines 154 are directly connected to electro-optic devices 136 at a first end and are coupled to a slip ring device 160 at a second end 162. Slip ring device 160 may include a plurality of electrically isolated inner rings, rings 166 and 168 shown, which are electrically coupled to respective wires of control lines 154. The inner rings 166 and 168 each make electrical contact with a respective outer ring 170 and 172. The respective outer rings 170 and 172 each are electrically coupled with a wire of control lines 156. In one embodiment, one of inner rings 166 and 168 or outer rings 170 and 172 include brushes which assist in making contact with the other of inner rings 166 and 168 or outer rings 170 and 172. Inner rings 166 and 168 move with second portion 142 while outer rings 170 and 172 remain stationary with housing 138.

Returning to FIG. 7, control lines 152 and control lines 153 for motors 106 and 108 pass through openings 178 in base member 134. As mentioned herein, control lines 152 and control lines 153 are electrically coupled to user inputs 124 and user displays 125. Through control lines 152 user inputs are communicated from user inputs 124 to electro-optic devices 136 and data captured by or produced by electro-optic devices 136 are sent to user displays 125. Through control lines 153 user inputs are communicated from user inputs 124 to pancake motors 106 and 108. Based on these inputs, pancake motor 106 and pancake motor 108 alter the orientation of electro-optic unit 100 about axis 144. In one embodiment, user inputs 124 include buttons for preset positions of electro-optic housing 102, such as the stored position of FIG. 5.

Figure 5:
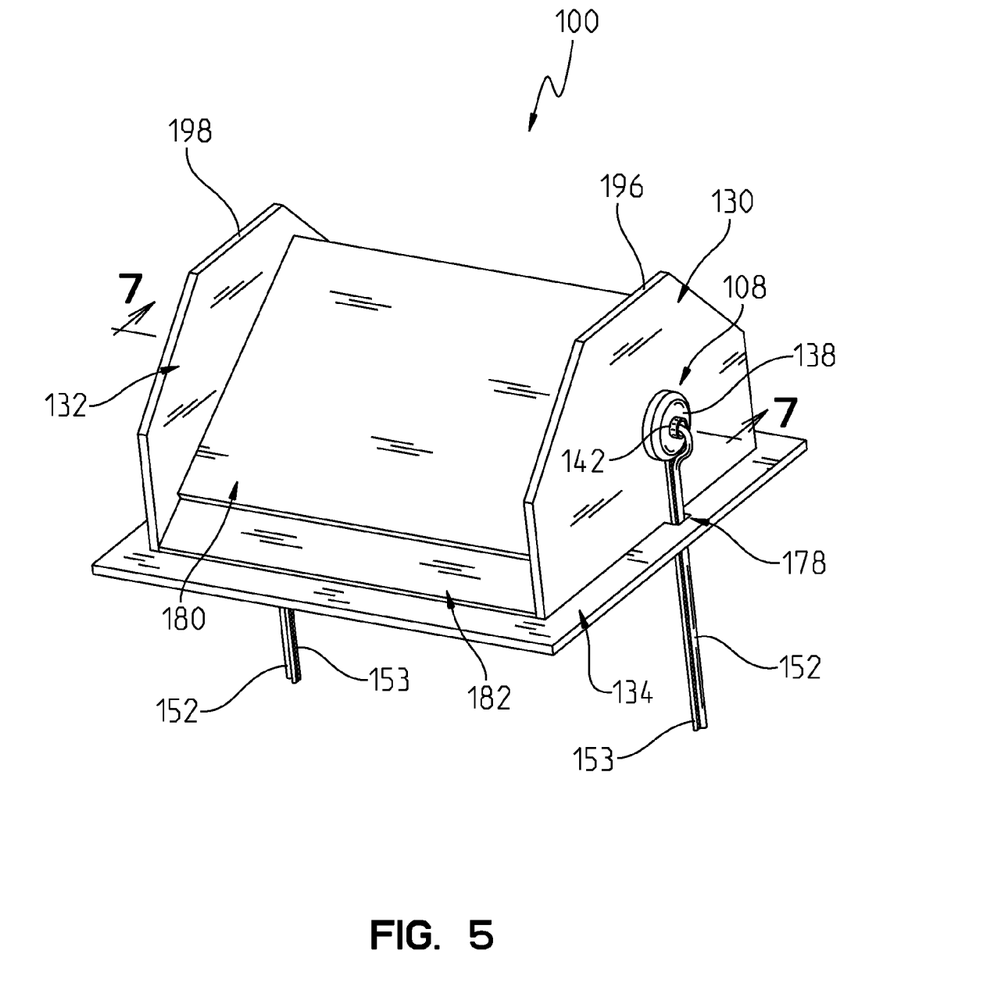
FIG. 5 illustrates a stored position of the electro-optic unit of FIG. 1.
Figure 9:
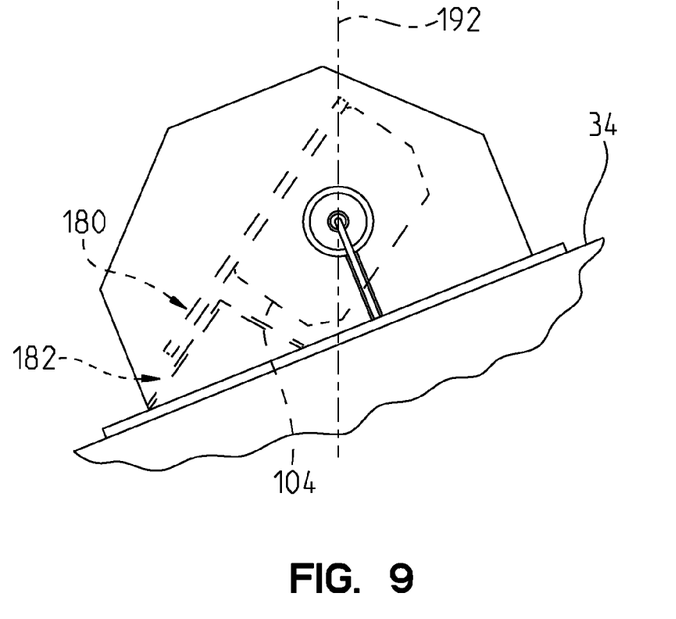
FIG. 9 illustrates a side view of the electro-optic unit of FIG. 1 in the stored position of FIG. 5.

Referring to FIGS. 5 and 9, electro-optic unit 100 is shown in a stored position. In the stored position, the optical windows 112, 116, 120, 123, and 126 in front face 104 of electro-optic unit 100 are hidden from view. Referring to FIG. 9, a bill 180 coupled to the top of housing 102 extends beyond front face 104. In one embodiment, a top member of housing 102 simply extends beyond front face 104 to create bill 180.

Figure 6:
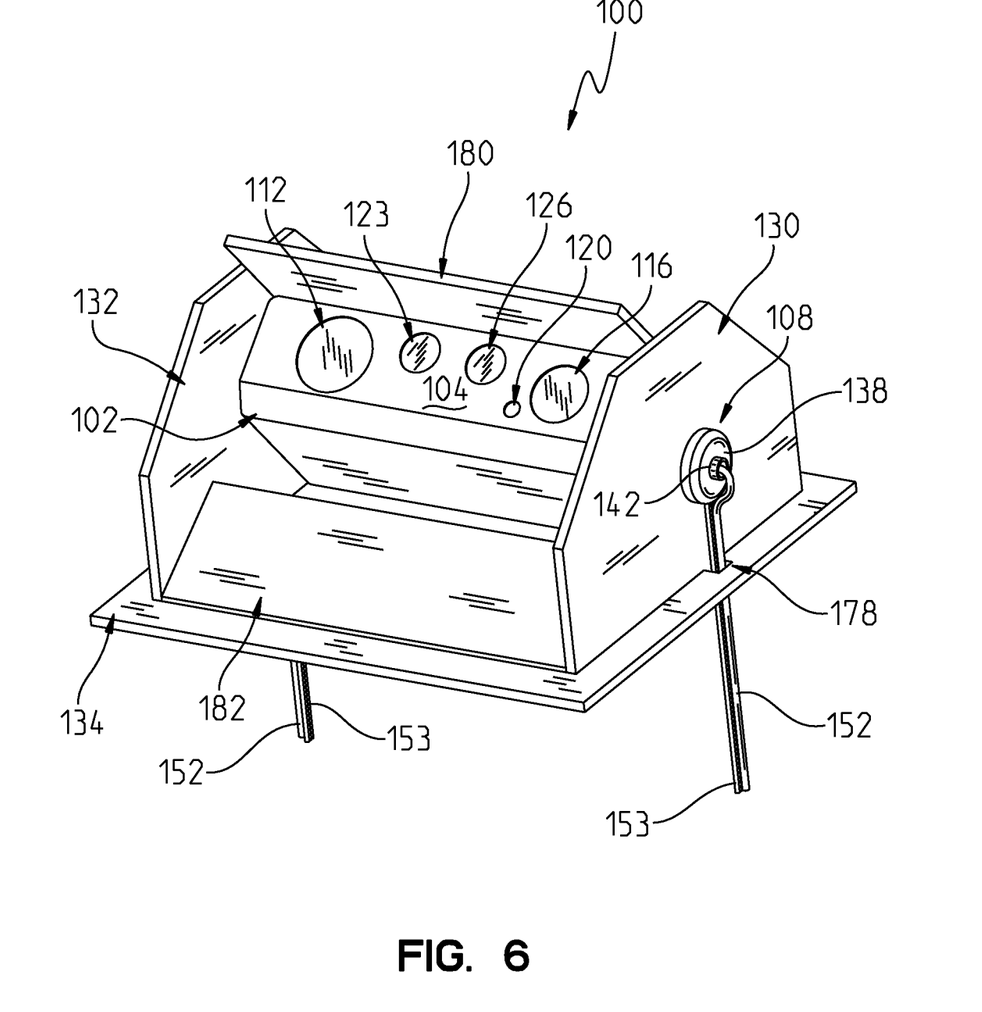
FIG. 6 illustrates a second use position of the electro-optic unit of FIG. 1.
Figure 10:
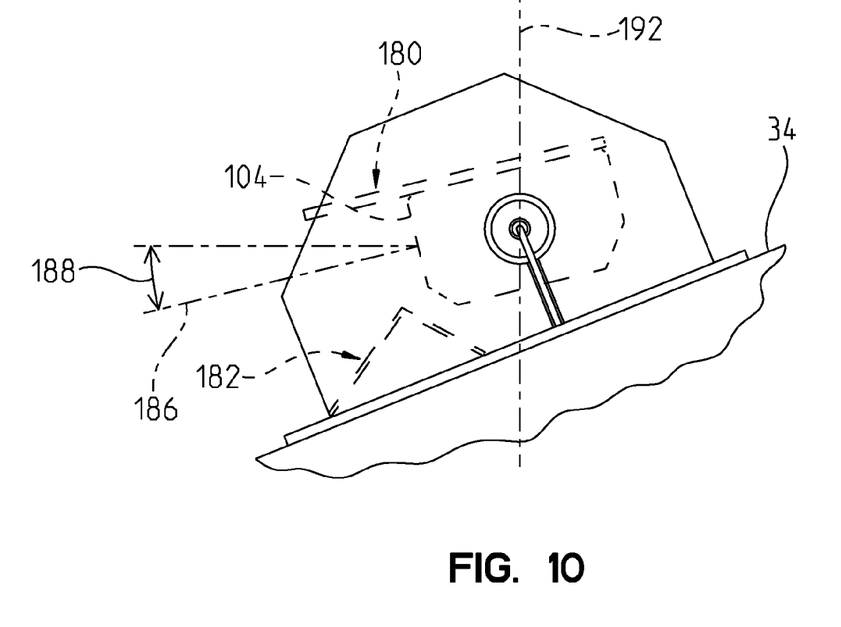
FIG. 10 illustrates a side view of the electro-optic unit of FIG. 1 in a first use position.
Figure 11:
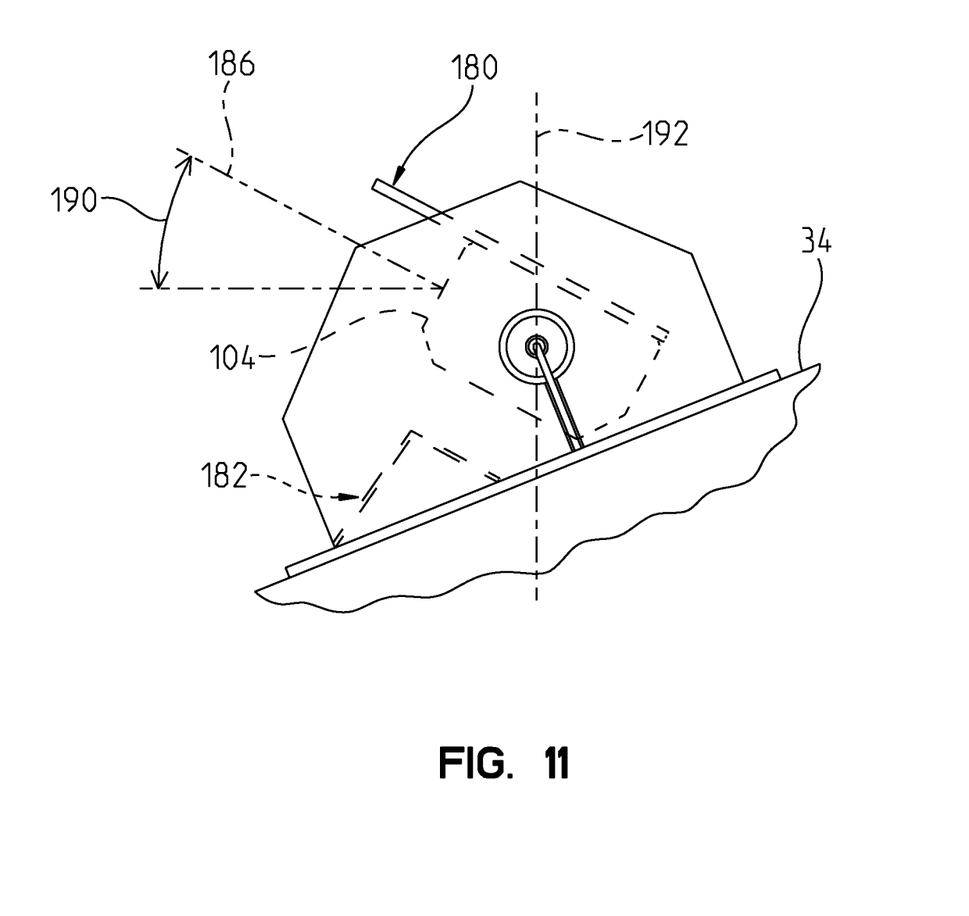
FIG. 11 illustrates a side view of the electro-optic unit of FIG. 1 in the second use position of FIG. 6.

Bill 180 of electro-optic unit 100 rests against a support 182 of electro-optic unit 100 when in the stored position of FIG. 9. Referring to FIG. 10, pancake motor 106 and pancake motor 108 rotate housing 102 upward to a first use position. When electro-optic unit 100 is coupled to skin 34, in the first use position a line 186 normal to front face 104 is angled downward from horizontal by an angle 188. In one embodiment, the value of angle 188 is about 20 degrees. Referring to FIGS. 6 and 11, pancake motor 106 and pancake motor 108 rotate housing 102 upward further to a second use position. When electro-optic unit 100 is coupled to skin 34, in the second use position line 186 is angled upward from horizontal by an angle 190. In one embodiment, the value of angle 190 is about 60 degrees.

In one embodiment, angle 188 is about 20 degrees, angle 190 is about 60 degrees, and electro-optic devices 136 may be active at any angle between angle 188 and angle 190. In the illustrated embodiment, both of angle 188 and angle 190 maintain front face 104 on a first side of a vertical plane 192 passing through axis 144. In one embodiment, angle 190 positions front face 104 on a second side of vertical plane 192 than angle 188 positions front face 104.

Since electro-optic unit 100 is mounted to a skin 34 of vehicle 100, electro-optic unit 100 does not alter the envelope 31 of operator area 30 regardless of whether electro-optic unit 100 is in a stored position or a use position. Further, the placement of electro-optic unit 100 makes it easier to service and upgrade than traditional periscope systems.

In one embodiment, a top cover (not shown) extends from guard 130 to guard 132 and is coupled to guard 130 at surface 196 and is coupled to guard 132 at surface 198. In one embodiment, a back cover is also included. The back cover follows the profile of guards 130 132 and continues down to base member 134. In one embodiment, the top cover and the back cover are combined in a single cover. In one embodiment, the top cover and the back cover are made of a ballistic material which protects the electro-optic unit 100 from projectiles fired towards electro-optic unit 100.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

The invention claimed is:

1. An electro-optic unit for mounting to a vehicle; the electro-optic unit comprising:
    a base;
    a housing comprising a first section forming an upper side of said housing, a second section forming a front section, back section, and bottom section of said housing, said housing further comprises a third section forming a lateral side of said second section, and a fourth section forming an opposing lateral side of said second section, said second section comprises an instrument section including therein one or more instruments comprising at least one of a visible band camera, a thermal imager, a laser pointing device, a laser designator, and a laser rangefinder;
    a first upstanding guard member supported by the base;
    a second upstanding guard member supported by the base;
    at least one motor supported by the base, wherein the housing is positioned between the first upstanding guard member and the second upstanding guard member and is rotatable around a first axis by the at least one motor relative to the first upstanding guard member and the second upstanding guard member;
    wherein the first upstanding guard member and the second upstanding guard member are made of a ballistic structure adapted to resist a ballistic impact up to a first force such that a projectile does not penetrate said first or second upstanding guard member;
    wherein said first and second upstanding guard members extend away from said base such that said first and second upstanding guard members cover said third and fourth sections as said housing rotates around said first axis;
    wherein said base further comprises a support section that extends from said base at first angle with a length such that it does not interfere with rotation of said front section of said second section between said first and second upstanding guard members;
    wherein said first section further comprises a planar extension section that extends away from said second section substantially parallel with said upper side, said planar extension section is adapted to form a protective cantilever structure over said front section of said second section, said front section is further formed with at least one optical window providing at least one field of view through said front section for a sensor section of said one or more instruments, said housing is positioned within said first and second upstanding guard members so that said planar extension section contacts said support section when said housing is in a stored position, wherein said housing is positioned and said support section is formed so said support structure does not obstruct said at least one optical window when said housing rotates away from said stored position so that said optical window has a substantially unobstructed said field of view above said support structure, wherein said support structure and said stored position is further defined by an orientation of said first section when said first section is oriented such that said support structure, planar extension, and said first section are adapted to present an angled strike face orientation with respect to a plane defined by said base when said housing in positioned in said stored position.

2. The electro-optic unit of claim 1, wherein the housing is rotatable in a single degree of freedom relative to the first upstanding guard member and the second upstanding guard member.

3. The electro-optic unit of claim 2, wherein the at least one motor is a pancake electrical motor which is coupled to one of the housing and the first upstanding guard member.

4. The electro-optic unit of claim 3, wherein the pancake electrical motor includes a hollow support shaft through which control wires from the at least one of a visible band camera, a thermal imager, a laser pointing device, a laser designator, and a laser rangefinder passes.

5. The electro-optic unit of claim 3, wherein the pancake electrical motor includes a slip ring through which control wires from the at least one of a visible band camera, a thermal imager, a laser pointing device, a laser designator, and a laser rangefinder passes are coupled to a user input.

6. A vehicle, comprising
a plurality of ground engaging members;
a frame supported by the plurality of ground engaging members;
a prime mover supported by the frame and operatively coupled to at least one of the plurality of ground engaging members to propel the vehicle;
a skin covering at least a portion of the frame; the skin defining an exterior of the vehicle; and
an electro-optic unit supported by the frame, the electro-optic unit including a base and a housing comprising a first section forming an upper side of said housing, a second section forming a front section, back section, and bottom section of said housing, said housing further comprises a third section forming a lateral side of said second section, and a fourth section forming an opposing lateral side of said second section, said second section comprising an instrument section supporting therein at least one of a visible band camera, a thermal imager, a laser pointing device, a laser designator, and a laser rangefinder and at least one optical window in an exterior of the housing, wherein the housing is rotatable around a first axis between a stored position and a use position, the housing remaining outside of the skin in both the stored position and the use position;
wherein said electro-optic unit further comprises a first guard member and a second guard member coupled to said base and supporting said housing on opposing lateral sides adjacent to said third and fourth sections, wherein said first axis is defined though a first and second attachment point in said first and second guard members;
wherein the first guard member and the second guard member each further comprise a ballistic structure adapted to resist a ballistic impact up to a first force such that a projectile does not penetrate said first or second guard member and penetrate said housing;
wherein said first and second guard members are formed to laterally cover said third and fourth sections as said housing rotates around said first axis;
wherein said base further comprises a support section that extends from said base at first angle with a length such that it does not interfere with rotation of said second section between said first and second guard members, said first and second guard members are adapted to position said housing above said support structure so as to permit said housing to rotate between said guard members;
wherein said first section further comprises a planar extension that extends away from said second section substantially parallel with said upper side, said planar extension is adapted to form a protective cantilever structure over said front section of said second section, said front section is further formed with at least one optical window, said housing is positioned within said first and second guard members so that said planar extension contacts said support section when said housing is in a stored position and does not obstruct said at least one optical window when said housing rotates away from said stored position, wherein said stored position is defined by an orientation of said first section when said first section is oriented at a non-parallel or non-perpendicular angle to a plane formed by a plane that passes through a center section of said ground engaging members of said vehicle.

7. The vehicle of claim 6, wherein the electro-optic unit is operatively coupled to at least one user input in an interior of the vehicle, the at least one user input providing an input to a motor which controls a movement of the housing.

8. The vehicle of claim 7, wherein a single degree of freedom of the electro-optic unit is a rotation about a horizontal axis and the input is one of a clockwise rotation about the horizontal axis and a counterclockwise rotation about the horizontal axis.

9. The vehicle of claim 8, wherein the electro-optic unit is operatively coupled to at least one display positioned in the interior of the vehicle.

10. The vehicle of claim 6, further comprising a motorized platform adapted to support an equipment item supported by the frame and rotatable relative to the frame at least about at least one axis, the skin further including a first portion supported by the motorized platform and movable with the motorized platform and a second portion supported by the frame and not movable with the motorized platform.

11. The vehicle of claim 10, wherein the electro-optic unit is supported by the motorized platform.

12. The vehicle of claim 11, wherein the single degree of freedom of the electro-optic unit is a rotation about a horizontal axis and the input is one of a clockwise rotation about the horizontal axis and a counterclockwise rotation about the horizontal axis and the at least one axis of the motorized platform is movable relative to the horizontal axis of the electro-optic unit.

13. The vehicle of claim 12, wherein the at least one axis is a single axis.

14. The vehicle of claim 13, wherein the single axis is perpendicular to the horizontal axis of the electro-optic unit.

15. The vehicle of claim 14, wherein the single axis is a vertical axis.

16. The vehicle of claim 10, wherein said motorized platform is an equipment turret.

17. The vehicle of claim 16, wherein said equipment turret is a weapons platform adapted to mount a weapon.

18. The vehicle of claim 17, wherein the vehicle is an armored vehicle.

19. The electro-optic unit of claim 1, further comprising an external top cover section that is coupled with a portion of edges of said first and second upstanding guard members so that said housing can rotate to a full traversal position such that said first section does not contact said external top cover section until said housing rotates to said full traversal position.

20. The electro-optic unit of claim 1, further comprising an external rear cover section that is coupled with a portion of edges of said first and second upstanding guard members on a side of said upstanding guard members which is further from said support section.

21. The electro-optic unit of claim 1 further comprising
an external top cover section that is coupled with a portion of edges of said first and second upstanding guard members so that said housing can rotate to a full traversal position such that said first section does not contact said external top cover section until said housing rotates to said full traversal position; and
an external rear cover that is coupled with a portion of edges of said first and second upstanding guard members on a side of said upstanding guard members which is further from said support section.

22. The electro-optic unit of claim 21, wherein said external rear cover section and said external top cover section comprise a ballistic structure adapted to resist said ballistic impact up to said first force such that said projectile does not penetrate said external top and rear cover sections.

23. The electro-optic unit of claim 20 wherein said external back cover section follows a portion of an external profile or edges of said guards and continues down to said base.

24. The electro-optic unit of claim 1 further comprising an external cover section coupled to a top and back edge sections of said upstanding guard members such that said cover partially encloses a space defined by said base, said first upstanding guard member, and said second upstanding guard member while leaving an opening for said planar extension to rotate within said space.

25. The vehicle of claim 6, further comprising an external top cover section that is coupled with a portion of edges of said first and second upstanding guard members so that said housing can rotate to a full traversal position such that said first section does not contact said external top cover section until said housing rotates to said full traversal position.

26. The vehicle of claim 6, further comprising an external rear cover section that is coupled with a portion of edges of said first and second guard members on a side of said guard members which is further from said support section.

27. The vehicle of claim 6, further comprising
an external top cover section that is coupled with a portion of edges of said first and second guard members so that said housing can rotate to a full traversal position such that said first section does not contact said external top cover section until said housing rotates to said full traversal position; and
an external rear cover that is coupled with a portion of edges of said first and second guard members on a side of said upstanding guard members which is further from said support section.

28. The vehicle of claim 27, wherein said external rear cover section and said external top cover section comprise a ballistic structure adapted to resist said ballistic impact up to said first force such that said projectile does not penetrate said external top and rear cover sections.

29. The vehicle of claim 26, wherein said external back cover section follows a portion of an external profile or edges of said guards and continues down to said base.

30. The vehicle of claim 6, further comprising an external cover section coupled to a top and back edge sections of said guard members such that said cover partially encloses a space defined by said base, said first guard member, and said second guard member while leaving an opening for said planar extension to rotate within said space.

31. The electro-optic unit of claim 1, further comprising a slip ring device comprising a plurality of electrically isolated inner rings which are electrically coupled to said one or more instruments, the inner rings each make electrical contact with a respective one or more outer rings, said respective outer rings each are electrically coupled with a control unit adapted to control said electro-optic unit, wherein said inner rings are formed in either said third and fourth sections, said outer rings are formed in either said first upstanding guard member or said second upstanding guard member.

32. The vehicle of claim 6, further comprising a slip ring device comprising a plurality of electrically isolated inner rings which are electrically coupled to said one or more instruments, the inner rings each make electrical contact with a respective one or more outer rings, said respective outer rings each are electrically coupled with a control unit adapted to control said electro-optic unit, wherein said inner rings are formed in either said third and fourth sections, said outer rings are formed in either said first guard member or said second guard member.

\* \* \* \* \*